(12) United States Patent
Whitmer et al.

(10) Patent No.: US 12,128,490 B2
(45) Date of Patent: Oct. 29, 2024

(54) CHIP BRUSH ASSEMBLY

(71) Applicant: The M.K. Morse Company, Canton, OH (US)

(72) Inventors: Lucas Andrew Whitmer, Bolivar, OH (US); Justin Lee Smith, Canton, OH (US)

(73) Assignee: The M.K. Morse Company, Canton, OH (US)

( * ) Notice: Subject to any disclaimer, the term of this patent is extended or adjusted under 35 U.S.C. 154(b) by 0 days.

(21) Appl. No.: 18/580,186

(22) PCT Filed: Jul. 20, 2022

(86) PCT No.: PCT/US2022/037766
§ 371 (c)(1),
(2) Date: Jan. 18, 2024

(87) PCT Pub. No.: WO2023/003982
PCT Pub. Date: Jan. 26, 2023

(65) Prior Publication Data
US 2024/0316662 A1  Sep. 26, 2024

Related U.S. Application Data

(60) Provisional application No. 63/223,687, filed on Jul. 20, 2021.

(51) Int. Cl.
*B25B 27/00* (2006.01)
*A46B 9/02* (2006.01)
(Continued)

(52) U.S. Cl.
CPC ............ *B23D 59/006* (2013.01); *A46B 9/026* (2013.01); *A46B 15/0097* (2013.01); *A46B 2200/3073* (2013.01)

(58) Field of Classification Search
CPC ...... A46B 13/02; A46B 15/00; B23D 59/006; A47K 3/00; A47L 23/02; A47L 11/00; A47L 9/06; B25B 27/00
See application file for complete search history.

(56) References Cited

U.S. PATENT DOCUMENTS 2,619,009 A   11/1952   Begle
3,485,123 A   12/1969   Komendowski
(Continued)

FOREIGN PATENT DOCUMENTS

GB     302949 A   12/1928
JP    9183016 A    7/1997

OTHER PUBLICATIONS

International Search Report filed in the corresponding PCT Application dated Sep. 26, 2022; 2 pages.
(Continued)

*Primary Examiner* — Lee D Wilson
(74) *Attorney, Agent, or Firm* — Black McCuskey

(57) ABSTRACT

A chip brush assembly includes a main body defining longitudinal and transverse axes defining a plane. The body has a central portion extending in the plane and at least two slots extend therein. At least one central shaft passageway extends therethrough parallel to the transverse axis. The body has a first end portion extending in the plane and away from the central portion parallel to the transverse axis and has at least one first end shaft passageway extending parallel to the longitudinal axis. The body has a second end portion extending away from the central portion askew to the plane and has at least one second end shaft passageway extending askew to the plane. At least two magnetic feet assemblies are retained in the at least two slots respectively. At least one brush shaft with a chip brush is disposed in at least one of the shaft passageways.

13 Claims, 5 Drawing Sheets

(51) Int. Cl.
*A46B 15/00* (2006.01)
*B23D 59/00* (2006.01)

(56) References Cited

U.S. PATENT DOCUMENTS

| | | | | |
|---|---|---|---|---|
| 3,673,903 | A | | 7/1972 | Evans |
| 3,864,779 | A | * | 2/1975 | Thomas ................. A46B 13/02 |
| | | | | 310/83 |
| 4,885,815 | A | * | 12/1989 | Smith ...................... A47L 1/05 |
| | | | | 15/103 |
| 7,100,230 | B2 | * | 9/2006 | Hillenbrand ........... A63B 47/04 |
| | | | | 7/159 |
| 2012/0324663 | A1 | * | 12/2012 | Fleischer ............... A46B 7/042 |
| | | | | 15/106 |
| 2021/0037960 | A1 | * | 2/2021 | Conner .................. A46B 17/06 |
| 2024/0225258 | A1 | * | 7/2024 | Phillips ................ A46B 5/0095 |
| 2024/0285380 | A1 | * | 8/2024 | Wei ...................... A46B 13/023 |

OTHER PUBLICATIONS

Written Opinion filed in the corresponding PCT Application dated Sep. 26, 2022; 3 pages.

Search Strategy filed in the corresponding PCT Application dated Sep. 26, 2022; 4 pages.

\* cited by examiner

CHIP BRUSH ASSEMBLY

CROSS-REFERENCE TO RELATED APPLICATIONS

This application claims priority to and the benefit of U.S. Patent Application 63/223,687, filed 20 Jul. 2022, the contents of which are hereby incorporated by reference in their entirety.

BACKGROUND

This relates in general to chip brushes and chip brush assemblies.

Chip brushes are, in general, used remove chips and other debris from cutting tools, such as saw blades, and sometimes particularly band saws, and work pieces, and related work areas. The use of chip brushes is expected to extend the working life of the these cutting tools, e.g., saw blades, and maintain the performance of an ongoing cutting operation. Chip brushes and related assemblies may be manufactured to be paired with particular cutting tools or specific cutting operations.

SUMMARY

This relates more particularly to a chip brush assembly. .
. .

A chip brush assembly has a main body defining a longitudinal axis and a transverse axis. The body has a central portion extending in a plane defined by the longitudinal and transverse axes and at least two slots therein extending in the plane and at least one central shaft passage way extends parallel to the transverse axis. The body has a first end portion extending in the plane and away from the central portion parallel to the transverse axis and has at least one first end shaft passageway extending parallel to the longitudinal axis. The body has a second end portion extending away from the central portion askew to the plane and has at least one second end shaft passageway extending askew to the plane.

The chip brush assembly includes at least two magnetic feet assemblies. One of each of the magnetic feet assemblies is retained in a respective one of the at least two slots in the main body.

At least one brush shaft is disposed in at least one of the shaft passageways. A chip brush is disposed on one end of the brush shaft.

In at least one embodiment, the at least two slots are parallel to the longitudinal axis.

In at least one embodiment, the slots are linearly aligned.

In at least one embodiment, the brush shaft incudes a shaft retainer and the passageways each include a seat to cooperate with the shaft retainer to retain the brush shaft to the main body. At least a portion of the passageways may have a cross sectional shape complementary to the shape of the shaft retainer. The shaft retainer may be a shaft head. The shaft retainer may be a nut.

In at least one embodiment, each of the magnetic feet are positionally adjustable along its respective slot.

In at least one embodiment, each magnetic feet assembly is adjustable in a direction perpendicular to the plane.

In at least one embodiment, the main body is a unitary body.

In at least one embodiment, the main body is formed of a metal or metal alloy.

In at least one embodiment, the main body is formed of a plastic or resin material.

In at least one embodiment, the chip brush has at least one of synthetic bristles, metal bristles, or coated bristles or a combination thereof.

Various aspects will become apparent to those skilled in the art from the following detailed description and the accompanying drawings.

DETAILED DESCRIPTION

Figure 1:
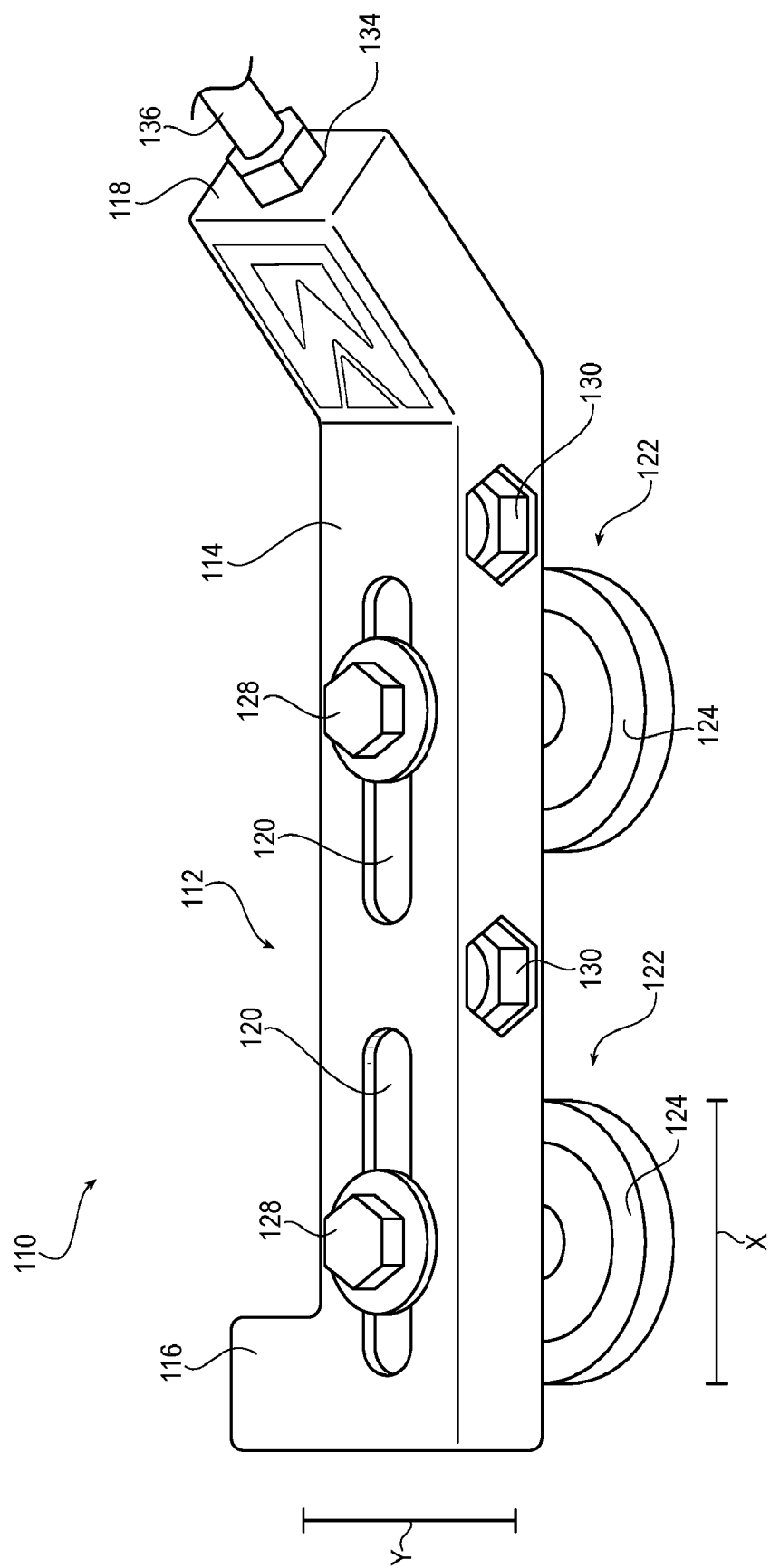
FIG. 1 is a top perspective view of a chip brush assembly.
Figure 2:
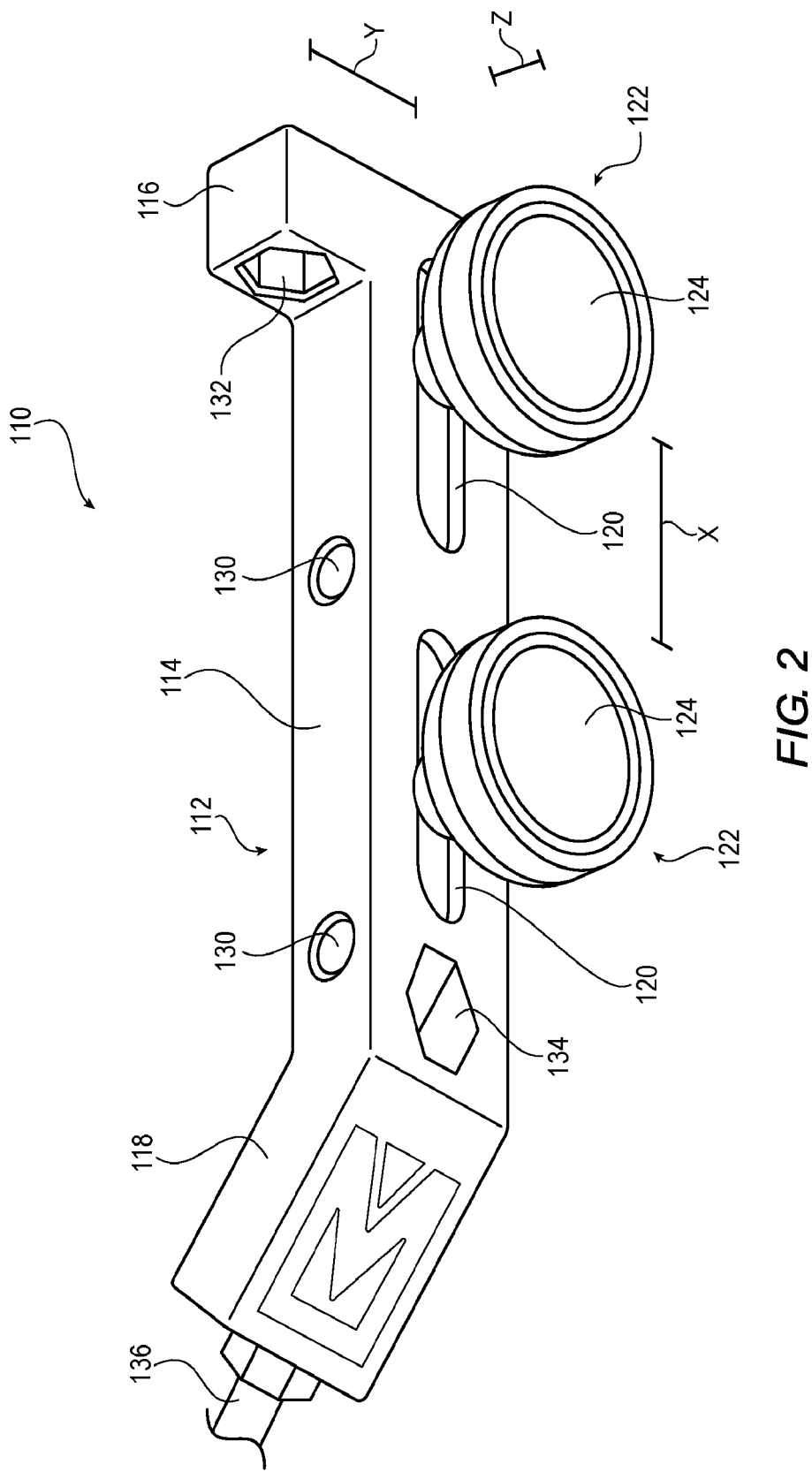
FIG. 2 is a bottom perspective view of the chip brush assembly of FIG. 1.
Figure 3:
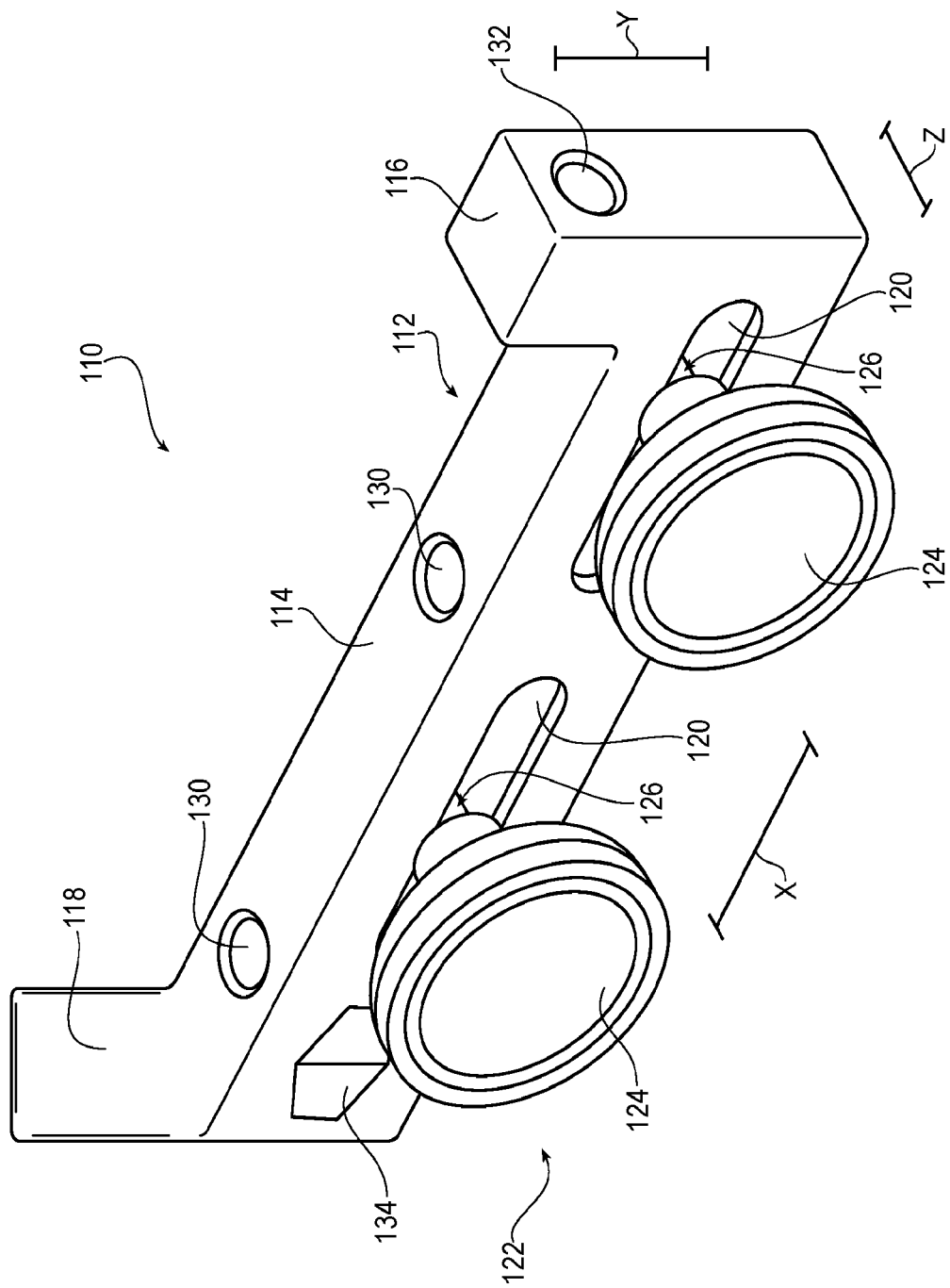
FIG. 3 is a bottom end perspective view of the brush assembly of FIG. 1.
Figure 4:
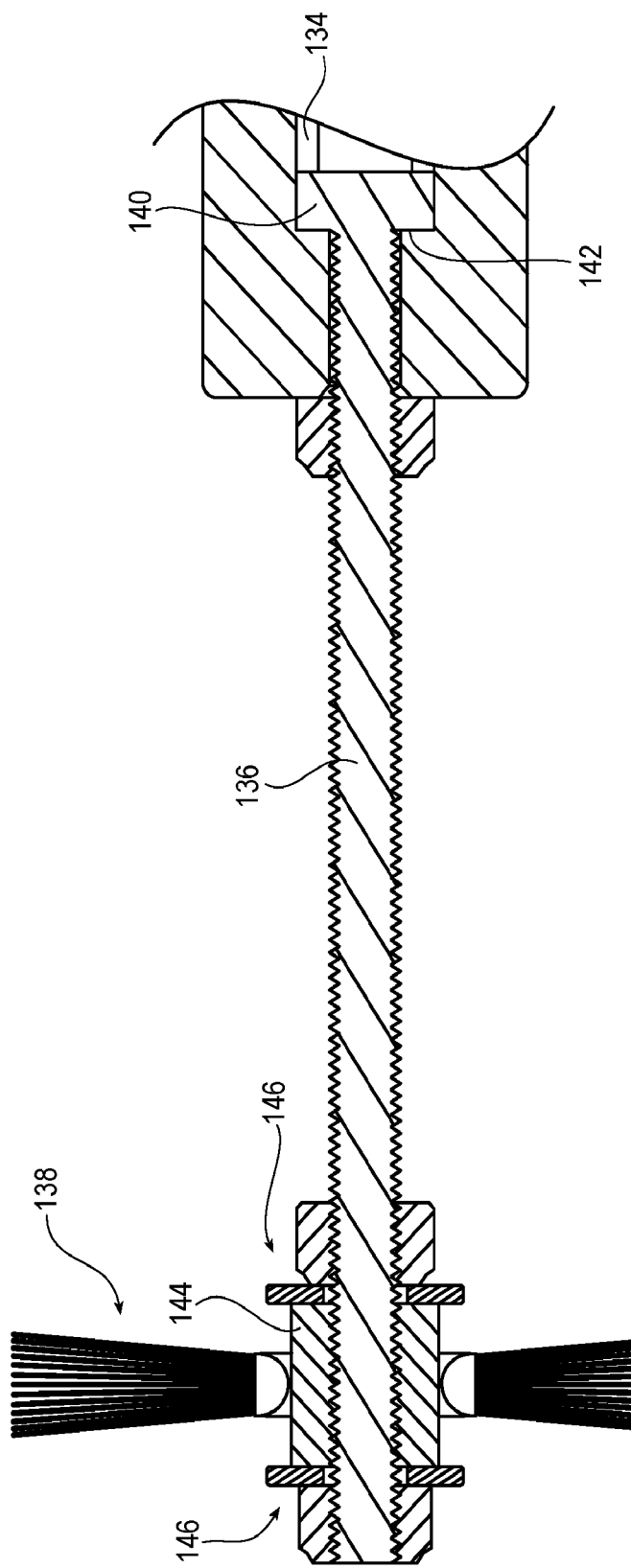
FIG. 4 is a partial cross-sectional view of the chip brush and brush mounting of the brush assembly of FIG. 1.
Figure 5:
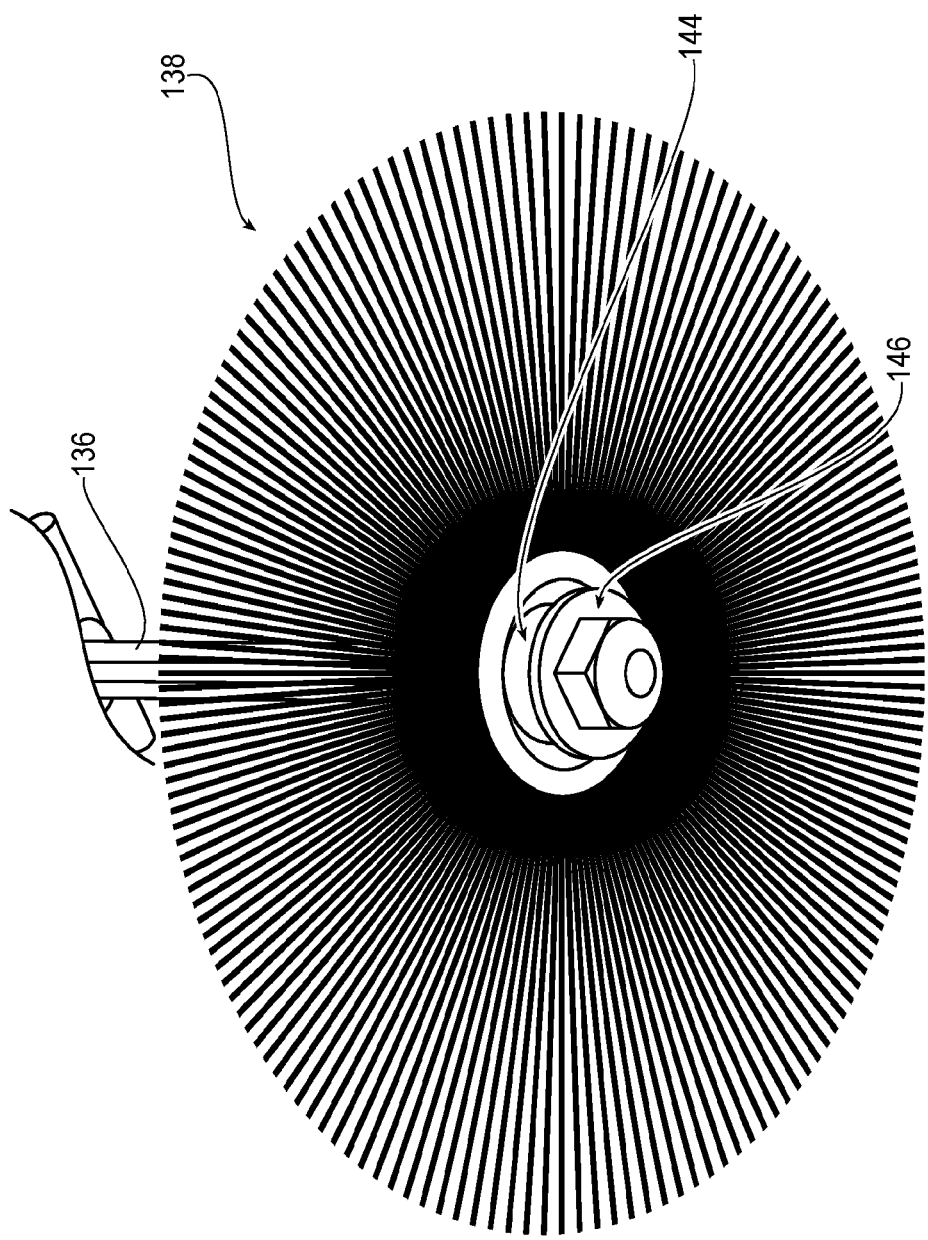
FIG. 5 is an end view of the chip brush of FIG. 4.

Referring now to the drawings, there is shown in FIGS. 1-5 a chip brush assembly 110. The assembly 110 includes a main body 112. The main body 112 has a central portion 114, a first end portion 116, and a second end portion 118. The main body 112 may formed from metal or metal alloy or plastic or resin material. The main body 112 may be monolithically formed as a unitary body, or may be formed in separate discrete pieces that are joined together, for example, by welding, chemical boding, adhesion, or fusion.

The main body 112 defines a longitudinal axis X and a transverse axis Y. The longitudinal and transverse axes X and Y define a plane. The central portion 114 extended in the plane defined by the longitudinal and transverse axes X and Y.

Two slots 120 are formed in the central portion and extend in the plane. In the illustrated embodiment the slots 120 are each parallel to the longitudinal axis X and linearly aligned with each other, while preferred, such is not required. Further, is must be understood that the central portion may have more than two slots 120.

Each slot 120 has a magnetic foot assembly 122 associated therewith. Each foot assembly 122 includes a magnetic food 124 retained to the slot 120 by a foot shaft 126 with a foot retainer 128. In the illustrated embodiment the foot retainer 128 includes a foot shaft head with a washer, although any suitable retention mechanism may be used, such as a nut.

The magnetic feet assemblies 122 are positionally adjustable along their respective slots 120. The magnetic feet 124 are adjustable in a direction perpendicular to the plane (Axis Z).

The central portion 114 has two central shaft passageways 130 extending parallel to the transverse axis Y, although any number may be utilized. The first end portion 116 extends in the plane and away from the central portion 114 parallel to the transverse axis Y. The first end portion 116 has at least one first end shaft passageway 132 extending parallel to the longitudinal axis X. The second end portion 118 extending away from the central portion 114 askew to the plane and has at least one second end shaft passageway 134 extending askew to the plane.

A brush shaft 136 is disposed in at least one of the shaft passageways 130, 132, 134. As shown, the brush shaft 136 is disposed in the second end passageway 134. It must be understood that the brush shaft 136 may be disposed in any of the passageways 130, 132, or 134. A chip brush 138 is disposed on an end of the brush shaft 136 away from the main body 112. The chip brush 138 may have synthetic bristles, metal bristles, or coated bristles, or any combination thereof.

The brush shaft 136 incudes a shaft retainer 140 and the passageways 130, 132, and 134 each include a head seat 142 to cooperate with the shaft retainer 140 to retain the brush shaft 136 to the main body 112. For example, the shaft retainer 140 may be a shaft head or a nut or other fastener cooperating with the brush shaft 136, for example, integrally formed or in threaded engagement.

Although not necessarily required, it is preferable that a portion of each of the passageways 130, 132, and 134 have a cross sectional shape complementary to the shape of the shaft retainer 140 to resist rotational movement of the shaft retainer 140 while disposed in the passageway 130, 132, or 124.

The chip brush 138 includes a shaft engagement 144. In the illustrated embodiment, the shaft engagement is a passive rotational bearing arrangement. However, the shaft engagement 144 may also be active, such as or including a motor or other device to rotate the chip brush 138. The chip brush 138 may be positionally adjusted along the length of the brush shaft 136. Further, it must be understood that the length of the brush shaft 136 may be chosen as desired depending upon the intended application.

Further, in the illustrated example, brush retainers 146, in the form of nuts and washers, are included to retain the chip brush 138 on the brush shaft 136. It must be understood that the brush retainers 146 may be any retention device suitable to retain the chip brush 138 on the brush shaft 136, such as collets, clips, pins or other devices.

Thus, in at least one embodiment, there is an adjustable chip brush assembly including at least a pair of magnetic feet for mounting the assembly relative to a cutting operation. The feet may be independently positioned in multiple positions (along at least the X and Z axes) to position the assembly in multiple positions and angles relative to a cutting machine and a blade of a cutting operation.

In at least one embodiment, an assembly includes at least one brush shaft which is positionable in multiple positions relative to the main body in one or more of a plurality of shaft passageways to provide for multi-positionability relative to a cutting machine and a blade of a cutting operation.

In at least one embodiment, at least one chip brush is mounted on at least one brush shaft to brush a cutting tool and/or work piece associated with a cutting operation of a cutting machine.

While principles and modes of operation have been explained and illustrated with regard to particular embodiments, it must be understood, however, that this may be practiced otherwise than as specifically explained and illustrated without departing from its spirit or scope.

What is claimed is:

1. A chip brush assembly comprising:
a main body defining a longitudinal axis and a transverse axis, the body having a central portion extending in a plane defined by the longitudinal and transverse axes and at least two slots therein extending in the plane and at least one central shaft passage way extending parallel to the transverse axis, the body having a first end portion extending in the plane and away from the central portion parallel to the transverse axis and having at least one first end shaft passageway extending parallel to the longitudinal axis, the body having a second end portion extending away from the central portion askew to the plane and having at least one second end shaft passageway extending askew to the plane;
at least two magnetic feet assemblies, one of each retained in one of the at least two slots respectively; and
at least one brush shaft disposed in at least one of the shaft passageways, having a chip brush disposed on one end thereof.

2. The chip brush assembly of claim 1 where the at least two slots are parallel to longitudinal axis.

3. The chip brush assembly of claim 2 where the slots are linearly aligned.

4. The chip brush assembly of claim 1 where the brush shaft incudes a shaft retainer and the passageways each include a seat to cooperate with the shaft retainer to retain the brush shaft to the main body.

5. The chip brush assembly of claim 4 where at least a portion of the passageways have a cross sectional shape complementary to the shape of the shaft retainer.

6. The chip brush assembly of claim 4 where the shaft retainer is a shaft head.

7. The chip brush assembly of claim 4 where the shaft retainer is a nut.

8. The chip brush assembly of claim 1 where each of the magnetic feet are positionally adjustable along its respective slot.

9. The chip brush assembly of claim 8 where each magnetic feet assembly is adjustable in a direction perpendicular to the plane.

10. The chip brush assembly of claim 1 where the main body is a unitary body.

11. The chip brush assembly of claim 1 where the main body is formed of a metal or metal alloy.

12. The chip brush assembly of claim 1 where the main body is formed of a plastic or resin material.

13. The chip brush assembly of claim 1 where the brush has at least one of synthetic bristles, metal bristles, or coated bristles.

* * * * *